US00RE44624E

(19) United States
(12) Reissued Patent
Gu et al.

(10) Patent Number: US RE44,624 E
(45) Date of Reissued Patent: Dec. 3, 2013

(54) SYMMETRIC PILOT PROCESSING FOR ROBUST TIMING OFFSET AND FREQUENCY OFFSET ESTIMATION IN RECEIVERS

(71) Applicants: Yongru Gu, Ladera Ranch, CA (US); Jun Ma, Shanghai (CN)

(72) Inventors: Yongru Gu, Ladera Ranch, CA (US); Jun Ma, Shanghai (CN)

(73) Assignee: Newport Media, Inc., Lake Forest, CA (US)

(21) Appl. No.: 13/645,478

(22) Filed: Oct. 4, 2012

Related U.S. Patent Documents

Reissue of:

(64) Patent No.: 7,912,157
Issued: Mar. 22, 2011
Appl. No.: 12/062,661
Filed: Apr. 4, 2008

(51) Int. Cl.
*H04L 27/06* (2006.01)

(52) U.S. Cl.
USPC ..... 375/344; 375/355

(58) Field of Classification Search
USPC ..... 375/344, 259–260, 285, 340, 342, 346, 375/349
See application file for complete search history.

(56) References Cited

U.S. PATENT DOCUMENTS

| | | | | |
|---|---|---|---|---|
| 7,184,495 | B2 | 2/2007 | Thomson et al. | |
| 7,203,255 | B2 | 4/2007 | Wang et al. | |
| 7,251,283 | B2 | 7/2007 | Chen | |
| 7,333,548 | B2 | 2/2008 | Chen | |
| 7,769,095 | B2 | 8/2010 | Wenzhen et al. | |
| 2006/0269003 | A1* | 11/2006 | Hammerschmidt et al. | 375/260 |
| 2007/0253499 | A1 | 11/2007 | Waters et al. | |
| 2007/0263576 | A1 | 11/2007 | Deguchi | |
| 2008/0075212 | A1* | 3/2008 | Chun et al. | 375/354 |
| 2008/0219340 | A1 | 9/2008 | Saed | |
| 2009/0225822 | A1 | 9/2009 | Tupala et al. | |

OTHER PUBLICATIONS

Speth, M. et al., "Optimum Receiver Design for Wireless Broad-Band Systems Using OFDM—Part I," IEEE Transactions On Communications, vol. 47, No. 11, Nov. 1999, pp. 1668 to 1677.

* cited by examiner

*Primary Examiner* — Jean B Corrielus
(74) *Attorney, Agent, or Firm* — Rahman LLC

(57) ABSTRACT

Timing and frequency offset processing in sub-carriers is performed in [an Integrated Services Digital Broadcasting-Terrestrial (ISDB-T)] *a* receiver system. Sub-carriers are divided into two sub-sets, where the sub-sets contain an equal number of sub-carriers. Subsequently bad sub-carriers are removed, if present, from first sub-set of the sub-sets, and corresponding sub-carriers from a second sub-set of the sub-sets are also removed. Further, a phase difference on each sub-carrier from each sub-set is computed, and mean phase differences of each of the sub-sets are computed. Furthermore, frequency offset is computed by averaging the mean phase differences of the sets.

23 Claims, 5 Drawing Sheets

SYMMETRIC PILOT PROCESSING FOR ROBUST TIMING OFFSET AND FREQUENCY OFFSET ESTIMATION IN RECEIVERS

Matter enclosed in heavy brackets [ ] appears in the original patent but forms no part of this reissue specification; matter printed in italics indicates the additions made by reissue.

*CROSS REFERENCE TO RELATED APPLICATION*

*This application is a reissue of U.S. Pat. No. 7,912,157, issued on Mar. 22, 2011, the contents of which in its entirety, is herein incorporated by reference.*

BACKGROUND

1. Technical Field

The embodiments herein generally relate to communication systems, and more particularly to the field of estimating offsets in Integrated Services Digital Broadcasting (ISDB) systems.

2. Description of the Related Art

Timing and frequency offsets cause sub-carrier phase rotation in an orthogonal frequency division multiplexing (OFDM) system, and can degrade system performance and, therefore, lead to large bit error rates. Thus, it is important to estimate and compensate for the offsets. The mean phase rotation indicates the frequency offset while the slope of phase rotation across the sub-carriers indicates the timing offset. Thus, the frequency and timing offsets can be estimated based on the mean and the slope of sub-carrier phase rotations. To estimate the frequency and the timing offsets, the sub-carriers are divided into two sub-sets, each subset having equal number of sub-carriers. One of the sub-sets contain sub-carriers which are to the left side the sub-carrier whose frequency is equal to the radio frequency (RF) center frequency of the transmitting station; i.e., the DC sub-carrier. The other sub-set contains sub-carriers to the right side of the DC sub-carrier. Next, the mean of sub-carrier phase rotations of the two sets are computed. Then, the average of the two mean phase rotations are the estimate of the frequency offset, and the difference of the two mean phase rotations is the estimate of the time offset. In a traditional method, if one sub-carrier in one of the sub-sets is a bad sub-carrier, then such a bad sub-carrier is removed from the computation of the mean phase rotation of that sub-set, and nothing is done for the computation of the mean phase rotation of the other sub-set.

However, for systems like 1-segment ISDB-T and ISDB-TSB, since the numbers of sub-carriers are very small, removal of bad sub-carriers would introduce large noise in the estimations of timing and frequency offsets.

SUMMARY

In view of the foregoing, an embodiment herein provides a method of computing timing and frequency offset in sub-carriers in an Integrated Services Digital Broadcasting-Terrestrial (ISDB-T) receiver system, and a program storage device readable by computer, tangibly embodying a program of instructions executable by the computer to perform the method of computing timing and frequency offset in sub-carriers in an ISDB-T receiver system, wherein the method comprises dividing the sub-carriers into two sub-sets, wherein the sub-sets comprise an equal number of sub-carriers; removing bad sub-carriers from a first sub-set of the sub-sets; removing sub-carriers from a second sub-set of the sub-sets that correspond to the bad sub-carriers from the first sub-set of the subsets; computing a phase difference on each sub-carrier from each sub-set; computing mean phase differences of each of the sub-sets; and computing a timing offset and a frequency offset in the sub-carriers using the computed mean differences.

In an embodiment, the frequency offset in the sub-carriers is computed by summing the mean phase differences of the sub-sets. Moreover, the timing offset in the sub-carriers may be computed by calculating the difference of the mean phase differences of the sub-sets. Preferably, a bad sub-carrier occurs when a magnitude of a received signal in the sub-carrier is smaller than a predetermined threshold level. In an embodiment, the sub-carriers from the second sub-set of the sub-sets that correspond to the bad sub-carriers from the first sub-set of the subsets are bad sub-carriers. In another embodiment, the sub-carriers from the second sub-set of the sub-sets that correspond to the bad sub-carriers from the first sub-set of the subsets are good sub-carriers. Preferably, a good sub-carrier occurs when a magnitude of a received signal in the sub-carrier is equal to or larger than a predetermined threshold level.

Another embodiment provides an apparatus for computing timing and frequency offset in sub-carriers in an ISDB-T receiver system, wherein the apparatus comprises means for dividing the sub-carriers into two sub-sets, wherein the sub-sets comprise an equal number of sub-carriers; means for removing bad sub-carriers from a first sub-set of the sub-sets; means for removing sub-carriers from a second sub-set of the sub-sets that correspond to the bad sub-carriers from the first sub-set of the subsets; means for computing a phase difference on each sub-carrier from each sub-set; means for computing mean phase differences of each of the sub-sets; and means for computing a timing offset and a frequency offset in the sub-carriers using the computed mean differences.

In an embodiment, the frequency offset in the sub-carriers is computed by summing the mean phase differences of the sub-sets. Moreover, the timing offset in the sub-carriers may be computed by calculating the difference of the mean phase differences of the sub-sets. Preferably, a bad sub-carrier occurs when a magnitude of a received signal in the sub-carrier is smaller than a predetermined threshold level. In an embodiment, the sub-carriers from the second sub-set of the sub-sets that correspond to the bad sub-carriers from the first sub-set of the subsets are bad sub-carriers. In another embodiment, the sub-carriers from the second sub-set of the sub-sets that correspond to the bad sub-carriers from the first sub-set of the subsets are good sub-carriers. Preferably, a good sub-carrier occurs when a magnitude of a received signal in the sub-carrier is equal to or larger than a predetermined threshold level.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
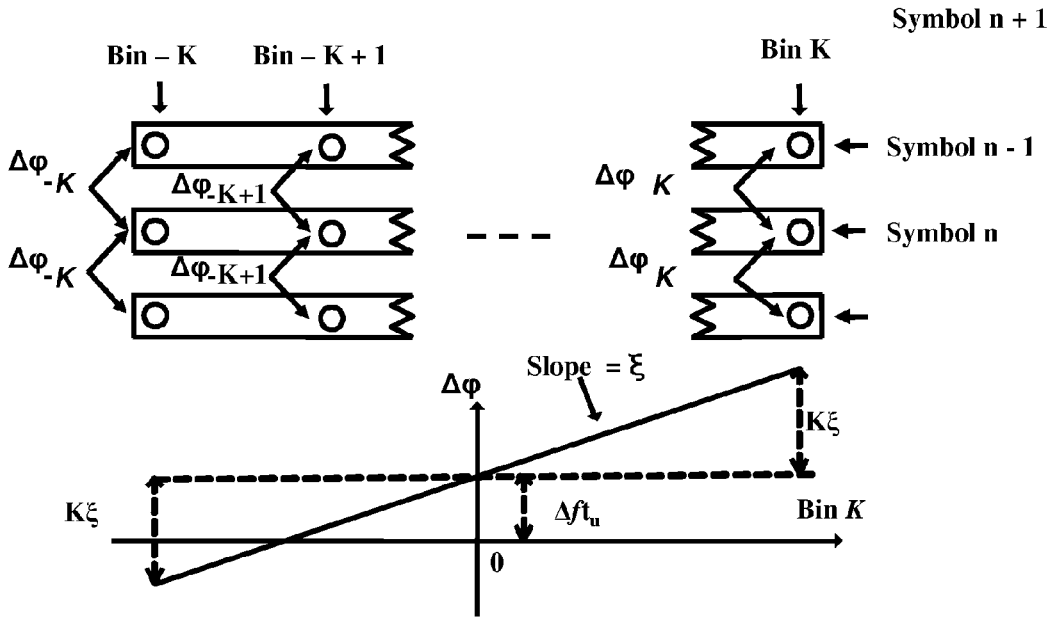
FIG. 1 illustrates sub-carrier rotation due to frequency and timing offset.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide techniques for removing bad sub-carriers from sub-carriers received at an ISDB-T receiver by performing symmetric processing on the sub-carriers. Referring now to the drawings, and more particularly to FIGS. 1 through 6, where similar reference characters denote corresponding features consistently throughout the figures, there are shown preferred embodiments.

FIG. 1 illustrates a graph representing timing and frequency offsets caused due to sub-carrier phase rotation in an OFDM system. Estimation and compensation of the offsets is accomplished by dividing the sub-carriers into two subsets with equal number of sub-carriers. One of the subsets contains sub-carriers which are to the left of the central sub-carrier; i.e., DC sub-carrier (e.g., sub-carrier K). The other sub-set contains sub-carriers to the right side of the DC sub-carrier. An average of two mean phase rotations provides an assessment for the frequency offset and/or the difference of the two mean phase rotations provides estimation for the time offset. In addition, in an OFDM system, the phase differences/rotation $\Delta\phi_{L_i}$ and $\Delta\phi_{R_i}$ (e.g., present on each side of the central DC sub-carrier) caused by timing and frequency offset is approximated as:

$$\Delta\phi_k \approx \Delta f T_u + \xi k \tag{1}$$

where $T_u$ is the OFDM symbol time, $\Delta f$ is the frequency offset, $\xi = \Delta T/T$ and is the timing offset in percentage, and k is the sub-carrier index, as described in Speth, M. et. al, "Optimum receiver design for wireless broad-band systems using OFDM—Part I," IEEE Trans. on Communications, vol. 47, no. 11, pp. 1668-1677, November 1999, the complete disclosure of which, in its entirety, is herein incorporated by reference. As illustrated in FIG. 1, the mean of phase rotation is equal to $\Delta f T_u$ and the slope of the phase rotation curve is the timing offset $\xi$.

Figure 2:
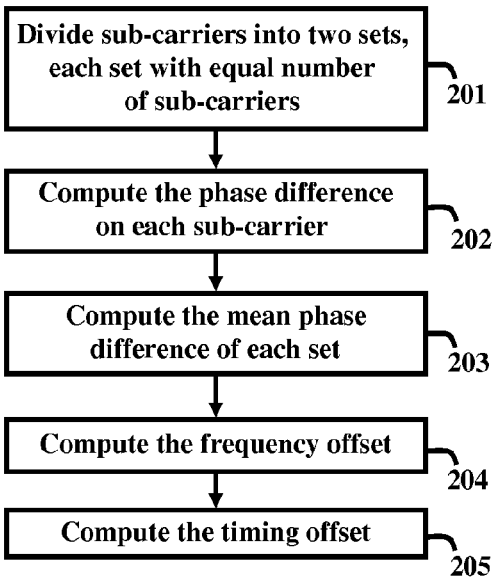
FIG. 2 is a flow diagram illustrating a preferred method according to a first embodiment herein.

FIG. 2, with reference to FIG. 1, is a flow diagram of a method according to a first embodiment herein. Sub-carriers are divided (201) into two equal sets and the phase difference on each sub-carrier is computed (202). Further, the mean phase difference of each set is computed (203) by:

$$\Delta\Gamma_L = \sum_{i=1}^{M} \Delta\varphi_{L_i} / M \tag{2}$$

$$\Delta\Gamma_R = \sum_{i=1}^{M} \Delta\varphi_{R_i} / M \tag{3}$$

Furthermore, the frequency offset is enumerated (204) by $(\Delta\Gamma_L + \Delta\Gamma_R)/2$. Lastly, the timing offset is computed (205) by $(\Delta\Gamma_L - \Delta\Gamma_R)/N$, wherein N is the mean distance of bin indices between the right sub-set and the left sub-set.

In a traditional way, if a bin is a bad bin and all other bins are good, then the bad bin could simply be removed from the computation of the mean phase difference in equations (2) and (3). In this context, a bin is "bad" when the received signal magnitude on that bin is too small. For example, if the signal magnitude is below half of the average signal magnitude, one may assume this to be a bad bin. This can cause some serious problems especially if the number of sub-carriers is very small. For example, consider a case where M=2, and $S_L = \{-1, -2\}$ and $S_R = \{1, 2\}$. The phase differences caused by frequency and timing offset of two-adjacent symbols is described as:

$$\Delta\phi_{-1} \approx T_u \Delta f - \xi \tag{4}$$

$$\Delta\phi_{-2} \approx T_u \Delta f - 2\xi \tag{5}$$

$$\Delta\phi_{1} \approx T_u \Delta f + \xi \tag{6}$$

$$\Delta\phi_{2} \approx T_u \Delta f + 2\xi \tag{7}$$

The mean set differences are obtained as:

$$\Delta\Gamma_L \approx (\Delta\phi_{-1} + \Delta\phi_{-2})/2 = (2T_u\Delta f - 3\xi)/2 \tag{8}$$

$$\Delta\Gamma_R \approx (\Delta\phi_{1} + \Delta\phi_{2})/2 = (2T_u\Delta f + 3\xi)/2 \tag{9}$$

The frequency offset and timing offset is calculated as:

$$\Delta\Gamma_L + \Delta T_R = 2T_u\Delta f \tag{10}$$

$$\Delta\Gamma_R - \Delta T_L \approx 3\xi \tag{11}$$

In case one of the bins is a bad bin, for example, bin −2 is a bad bin, the mean set phase differences are:

$$\Delta\Gamma_L \approx \Delta\phi_{-1}/2 = (T_u\Delta f - \xi)/2 \tag{12}$$

$$\Delta\Gamma_R \approx (\Delta\phi_{1} + \Delta\phi_{2})/2 = (2T_u\Delta f + 3\xi)/2 \tag{13}$$

The sum and difference of the set differences are:

$$\Delta\Gamma_L + \Delta T_R \approx (3T_u\Delta f + 2\xi)/2 \tag{14}$$

$$\Delta\Gamma_R - \Delta T_L \approx (T_u\Delta f + 4\xi)/2 \tag{15}$$

$\Delta\Gamma_L + \Delta T_R$ is a function of both frequency offset and timing offset, and $\Delta\Gamma_R - \Delta T_L$ is also a function of both of two offsets. If the frequency offset and timing offset are calculated, then very noisy estimates may be derived. Therefore, to alleviate this, in case there are bad sub-carriers, the embodiments herein perform symmetric processing for the bad pilots.

In the computation of the mean set difference, the embodiments herein not only remove the bad sub-carriers in one of the sub-set, but also remove their corresponding sub-carriers in the other sub-set. The corresponding bad sub-carriers are different for the estimation of the timing and frequency offsets, so for each sub-set, two mean differences are computed, one for the timing offset, and one for the frequency offset.

Consider the above example, if it is assumed only bin −2 is a bad bin, then the mean set difference of the left sub-set is calculated as:

$$\Delta\Gamma_L \approx \Delta\phi_{-1}/2 = (T_u\Delta f - \xi)/2 \tag{16}$$

This mean difference can be used for both the frequency and timing offset estimations. For the right sub-set, two means are computed; one will be used for the timing offset estimation and the other will be used for the frequency offset. These are denoted as $\Delta\Gamma_{Rf}$ and $\Delta\Gamma_{Rt}$, respectively. In the calculation of $\Delta\Gamma_{Rf}$, the embodiments herein remove bin 2 even if bin 2 is a good bin and for $\Delta\Gamma_{Rt}$, the embodiments herein remove bin 1 even if bin 1 is a good bin. In this context, a good sub-carrier occurs when a magnitude of a received signal in the sub-carrier is equal to or larger than a predetermined threshold level.

$$\Delta\Gamma_{Rf} \approx (\Delta\phi_1)/2 = (T_u\Delta f + \xi)/2 \tag{17}$$

$$\Delta\Gamma_{Rt} \approx (\Delta\phi_2)/2 = (T_u\Delta f + 2\xi)/2 \tag{18}$$

For the left set, the mean differences for the timing and frequency offsets $\Delta\Gamma_{Lt}$ and $\Delta\Gamma_{Lf}$ would be same in this case and are equal to:

$$\Delta\Gamma_{Lt} = \Delta\Gamma_{Lf} = (T_u\Delta f - \xi)/2 \tag{19}$$

The summation of the mean phase differences of the two sub-sets for frequency offset would be:

$$\Delta\Gamma_{Lf} + \Delta T_{Rf} \approx T_u\Delta f \tag{20}$$

From the above equation (20), it can be seen that $\Delta\Gamma_{Lf}+\Delta T_{Rf}$ is no longer a function of both frequency offset and timing offset. It is a linear function of the frequency offset. The difference of the mean phase differences of the two sub-sets for frequency offset would be:

$$\Delta\Gamma_{Rt} - \Delta T_{Lt} \approx 1.5\xi \tag{21}$$

From the above equation (21), it can be seen that $\Delta\Gamma_{Rt}-\Delta T_{Lt}$ is no longer a function of both frequency offset and timing offset; rather it is a linear function of the timing offset.

In order to conduct the symmetric processing process to estimate the frequency and timing offsets, according to the embodiments herein, if one bin in one of the sub-sets is a bad bin, this bin is removed and also the corresponding bin in the other set in the calculation of the set phase differences is removed. Furthermore, for each set, two mean phase differences are computed: one for timing offset, and the other for frequency offset.

For frequency offset calculation, bins $L_i$ and $R_{M-i+1}$ form a pair of correlated sets. In one of bins in the correlated set is bad, it is removed from the calculation of the set phase difference. Furthermore, the other bin in the set for calculation of the set phase difference is removed even though that bin is a good bin. For performing timing offset calculation, bins $L_i$ and $R_i$ form a pair of correlated sets. If one of bins in the correlated is bad, it is removed from the calculation of the set phase difference, and the other bin in the set for calculation of the set phase difference is also removed even though that bin is a good bin.

For example, if it is assumed bin $L_n$ in the left bin sub-set $S_L=\{L_1, L_2, L_3, \ldots, L_M\}$ is a bad bin. The left set phase differences for timing offset and frequency offsets would be:

$$\Delta\Gamma_{Lf} = \Delta\Gamma_{Lt} = \left(\sum_{i=1, i\neq n}^{M} \Delta\varphi_{L_i}\right) \Big/ M \tag{22}$$

To calculate the mean phase difference of the right sub-set for frequency offset, bin $R_{M-n+1}$ is removed; i.e., $$\Delta\Gamma_{Rf} = \left(\sum_{i=1, i\neq M-n+1}^{M} \Delta\varphi_{L_i}\right) \Big/ M \tag{23}$$

To calculate the mean phase difference of the right sub-set for timing offset, bin $R_n$ is removed; i.e., $$\Delta\Gamma_{Rt} = \left(\sum_{i=1, i\neq n}^{M} \Delta\varphi_{L_i}\right) \Big/ M \tag{24}$$

The summation of $\Delta\Gamma_{Lf}$ and $\Delta T_{Rf}$ indicates the frequency offset and the difference between $\Delta\Gamma_{Rt}$ and $\Delta T_{Lt}$ indicates the timing offset.

Figure 3:
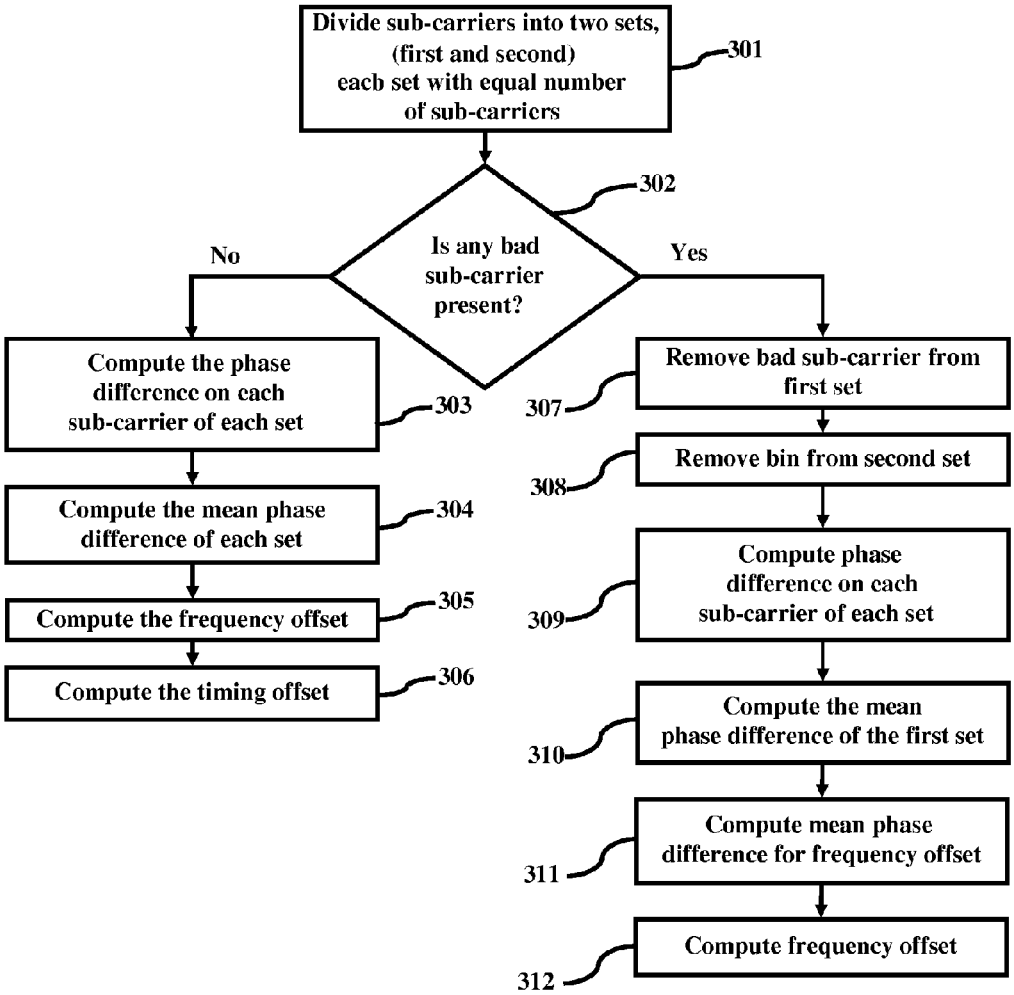
FIG. 3 is a flow diagram illustrating a preferred method according to a second embodiment herein.

FIG. 3 is a flow diagram according to a second embodiment herein, where division of sub-carriers into two equal sets (first and second) is performed (301). The presence of any bad sub-carrier is detected (302). If there are no bad sub-carriers detected, then the phase difference of each sub-carrier of each set is calculated (303). Further, the mean phase difference of each set is calculated (304). Thereafter, the frequency offset is computed (305) and the timing offset is computed (306). If a bad sub-carrier is detected, then the process of performing symmetric processing for bad sub-carriers is enacted. In symmetric processing for the bad sub-carriers, if any of the bad sub-carrier is detected, then that particular sub-carrier is removed (307) from the respective sub-set (first set). According to symmetric processing for the bad sub-carriers, the corresponding sub-carriers in other sub-set (second set) is also removed (308). After removal of the bad sub-carrier, the phase difference on each of the sub-carriers of each sub-set is computed (309). In the next step, the mean phase difference of the first set is calculated (310). Furthermore, the mean phase difference for the frequency offset is then calculated (311). Lastly the frequency offset is calculated (312).

Figure 4:
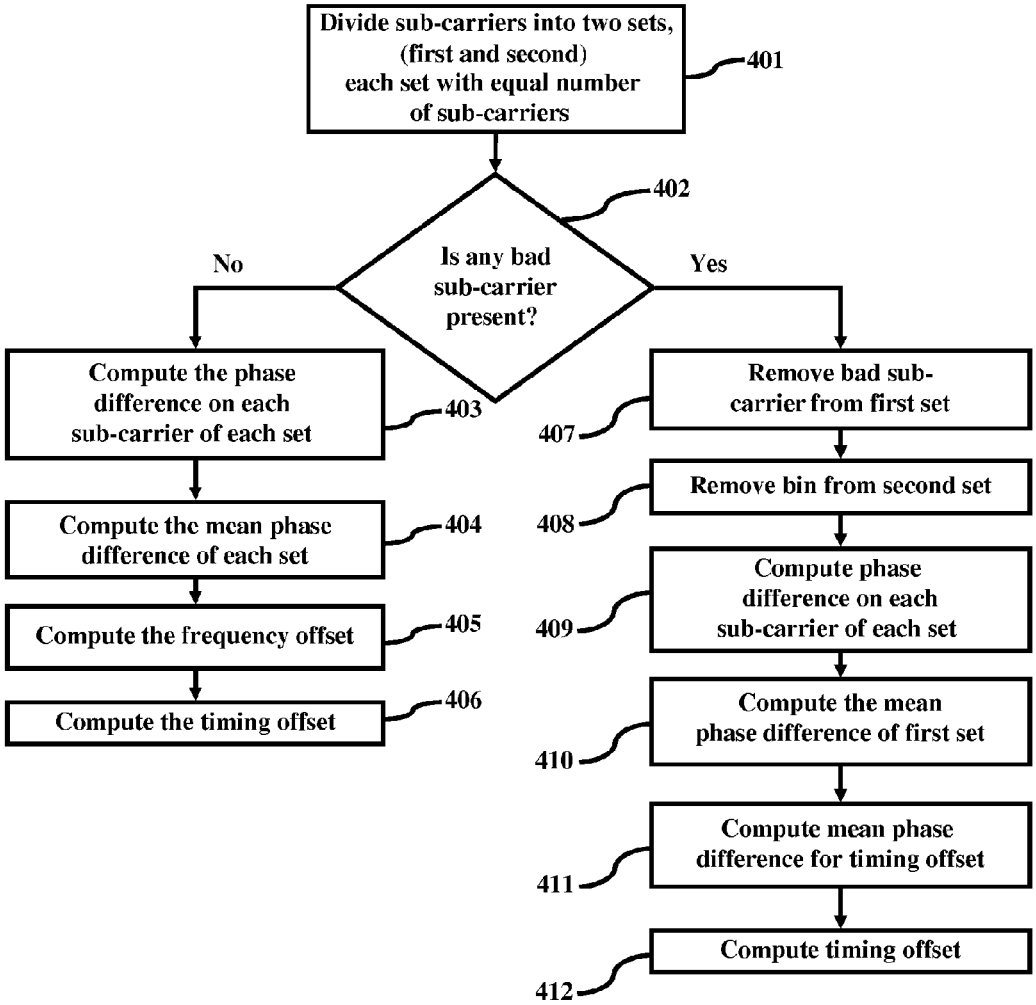
FIG. 4 is a flow diagram illustrating a preferred method according to a third embodiment herein.

FIG. 4 is a flow diagram of a third embodiment according to the embodiments herein, where division of sub-carriers into two equal sets (first and second) is performed (401). In the next step, the presence of any bad sub-carrier is detected (402). If there are no bad sub-carriers detected, then the phase difference on each sub-carrier of each set is computed (403). In the next step, the mean phase difference of each set is calculated (404). Moreover, the frequency offset is computed (405) and the timing offset is computed (406). If bad sub-carriers are detected, then the process of symmetric processing for bad sub-carriers is enacted. In symmetric processing, for the bad sub-carriers if any bad sub-carrier is detected, then that particular sub-carrier is removed (407) from the respective sub-set; i.e. the bad sub-carrier is removed from the first set. According to symmetric processing for bad sub-carriers, the corresponding sub-carriers in the other sub-set (second set) are removed (408). After removal of the corresponding bad sub-carrier, the phase difference on each of the sub-carrier of each the sub-set is computed (409). Next, the mean phase difference of the first set is calculated (410). Furthermore, the mean phase difference for the timing offset is calculated (411). Finally, the timing offset is calculated (412).

Figure 5:
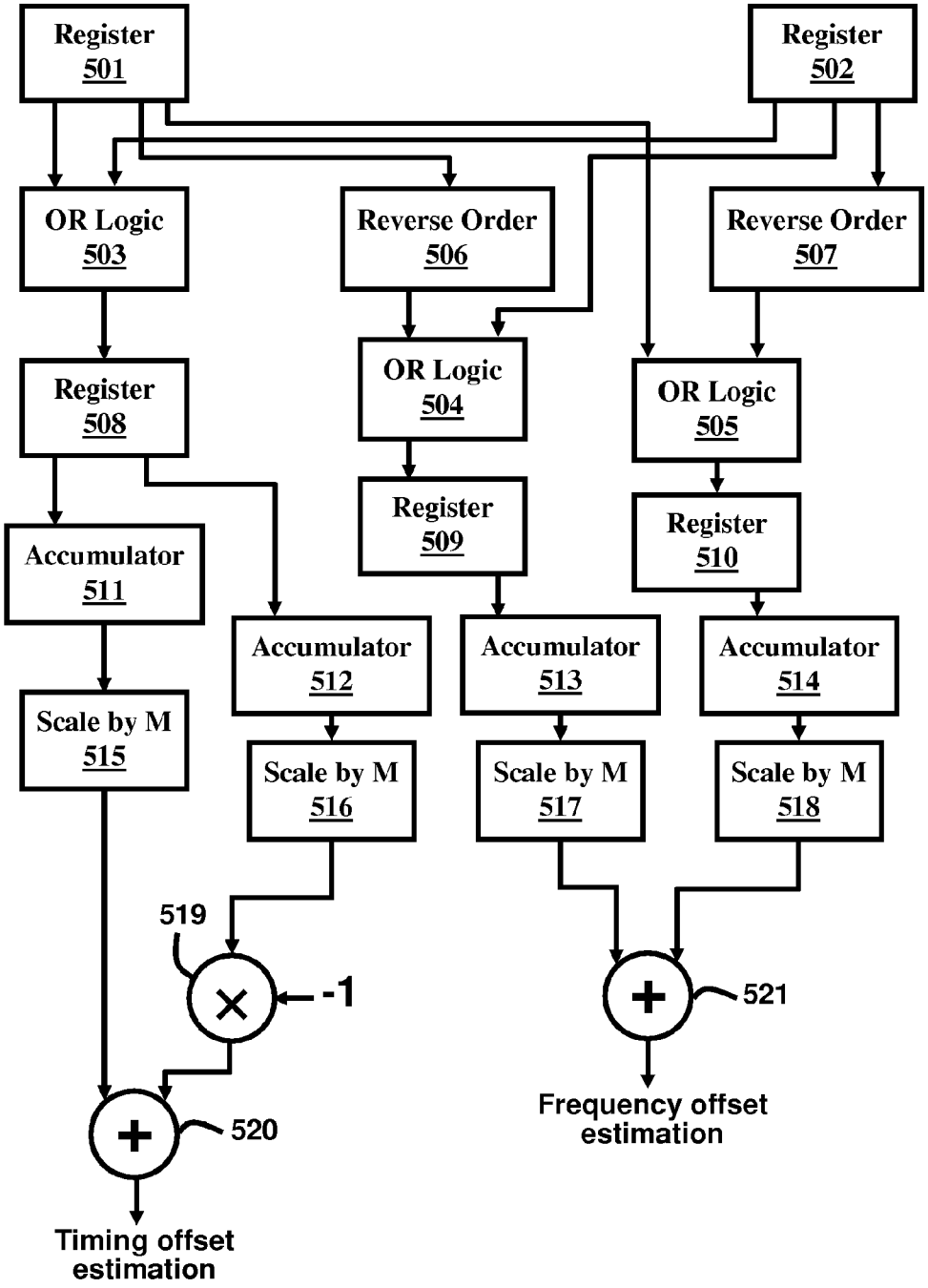
FIG. 5 is a block diagram illustrating an apparatus for performing timing and frequency offset estimation according to an embodiment herein.

FIG. 5 is a block diagram illustrating an apparatus for performing timing and frequency offset estimation according to an embodiment herein. As shown, it is first determined whether a bin is good bin or bad bin. If the bin is bad bin, it is marked as a bad bin. This bad bin classification will be used subsequently when these bad bins are excluded in the accumulation processes. Since the bad bins will be used later, they are stored in storage devices. For example, in an integrated circuit chip, registers or memory may be used to store this information. Bad bins are marked as "bad bins" in register 501 for the left sub-set, and bad bins are marked as "bad bins" in register 502 for the right sub-set. OR logic 503-505 is embodied as a digital logic device adapted to perform a Boolean operation 'OR'. The bad bins are processed in reverse order 506, 507 prior to being entered into the OR logic devices 504, 505. Thereafter, bad bins are marked as "bad bins" in registers 508-510 for, respectively, both the left and right sub-sets for the timing offset (register 508), the left sub-set for the frequency offset (register 509), and the right sub-set for the frequency offset (register 510).

From register 508, the phase difference for the "good bins" in the left sub-set are accumulated in accumulator 511 and then are scaled (515) by M (where M is the number of bins in the left-right sub-set). Also, from register 508, the phase difference for the "good bins" in the right sub-set are accumulated in accumulator 512 and then are scaled (516) by M. From register 509, the phase difference for the "good bins" in the left sub-set are accumulated in accumulator 513 and then are scaled (517) by M. From register 510, the phase difference for the "good bins" in the right sub-set are accumulated in accumulator 514 and then are scaled (518) by M. After scaling (516) by M, the offset is multiplied (519) by −1 and then is added (520) with the offset from the scaling process (515) to generate the overall timing offset estimation. The scaling 517-518 are combined (521) together to generate the overall frequency offset estimation.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
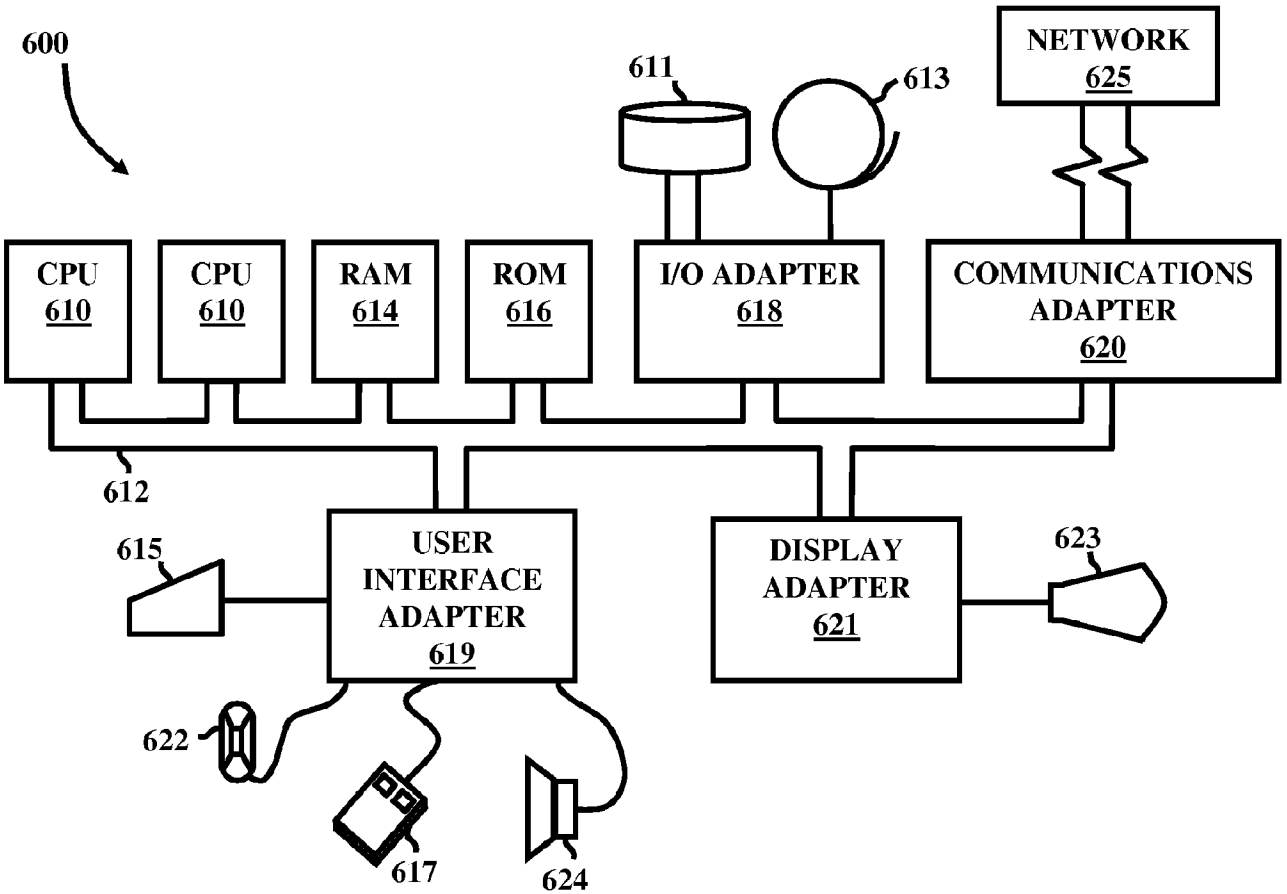
FIG. 6 is a system diagram of computer architecture used in accordance with the embodiments herein.

A representative hardware environment for practicing the embodiments herein is depicted in FIG. 6. This schematic drawing illustrates a hardware configuration of an information handling/computer system 600 in accordance with the embodiments herein. The system 600 comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system 600. The system 600 can read the inventive instructions on the program storage devices and follow these instructions to execute the methodology of the embodiments herein. The system 600 further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

Generally, the embodiments provide a symmetric processing approach to estimate the time offset is to remove the bad sub-carrier and the corresponding sub-carrier in other set while calculating the set phase differences. For the timing offset calculation, sub-carriers $L_i$ and $R_i$ form a pair of correlated sets. If one of the sub-carriers in the sub-set is bad, the bad sub-carrier has to be removed from calculation of set phase difference. The other sub-carrier in the set is removed for calculation of the set phase difference even if that sub-carrier is a good sub-carrier.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of computing timing and frequency offset in sub-carriers in [an Integrated Services Digital Broadcasting-Terrestrial (ISDB-T)] *a* receiver [system], said method comprising:

storing said sub-carriers in a storage device;

[using a processor for] dividing said sub-carriers into two sub-sets, *using a processor,* wherein [said] *the* sub-sets comprise an equal number of sub-carriers;

removing bad sub-carriers from a first sub-set of said sub-sets;

removing sub-carriers from a second sub-set of said sub-sets that correspond to said bad sub-carriers from said first sub-set of said [subsets] *sub-sets*;

computing a phase difference on each sub-carrier from each sub-set responsive to the removing steps;

computing mean phase differences of each of said sub-sets responsive to the computing step; and computing a timing offset and a frequency offset in said sub-carriers using the computed mean differences.

2. The method of claim 1, wherein said frequency offset in said sub-carriers is computed by summing said mean phase differences of said sub-sets.

3. The method of claim 1, wherein said timing offset in said sub-carriers is computed by calculating [the] *a* difference of said mean phase differences of said sub-sets.

4. The method of claim 1, wherein a bad sub-carrier occurs when a magnitude of a received signal in said sub-carrier is smaller than a predetermined threshold level.

5. The method of claim 1, wherein said sub-carriers from said second sub-set of said sub-sets that correspond to said bad sub-carriers from said first sub-set of said [subsets] *sub-sets* are bad sub-carriers.

6. The method of claim 1, wherein said sub-carriers from said second sub-set of said sub-sets that correspond to said bad sub-carriers from said first sub-set of said [subsets] *sub-sets* are good sub-carriers.

7. The method of claim 6, wherein a good sub-carrier occurs when a magnitude of a received signal in said sub-carrier is equal to or larger than a predetermined threshold level.

8. A non-transitory program storage device readable by computer, tangibly embodying a program of instructions executable by said computer to perform a method of computing timing and frequency offset in sub-carriers in [an Integrated Services Digital Broadcasting-Terrestrial (ISDB-T)] *a* receiver [system], said method comprising:

[using a processor for] dividing said sub-carriers into two sub-sets, *using a processor,* wherein [said] *the* sub-sets comprise an equal number of sub-carriers;

removing bad sub-carriers from a first sub-set of said sub-sets;

removing sub-carriers from a second sub-set of said sub-sets that correspond to said bad sub-carriers from said first sub-set of said [subsets] *sub-sets*;

computing a phase difference on each sub-carrier from each sub-set responsive to the removing steps;

computing mean phase differences of each of said sub-sets responsive to the computing step; and computing a timing offset and a frequency offset in said sub-carriers using the computed mean differences.

9. The program storage device of claim 1, wherein said frequency offset in said sub-carriers is computed by summing said mean phase differences of said sub-sets.

10. The program storage device of claim 1, wherein said timing offset in said sub-carriers is computed by calculating [the] *a* difference of said mean phase differences of said sub-sets.

11. The program storage device of claim 1, wherein a bad sub-carrier occurs when a magnitude of a received signal in said sub-carrier is smaller than a predetermined threshold level.

12. The program storage device of claim 1, wherein said sub-carriers from said second sub-set of said sub-sets that correspond to said bad sub-carriers from said first sub-set of said [subsets] *sub-sets* are bad sub-carriers.

13. The program storage device of claim 1, wherein said sub-carriers from said second sub-set of said sub-sets that correspond to said bad sub-carriers from said first sub-set of said [subsets] *sub-sets* are good sub-carriers.

14. The program storage device of claim 13, wherein a good sub-carrier occurs when a magnitude of a received signal in said sub-carrier is equal to or larger than a predetermined threshold level.

15. An apparatus for computing timing and frequency offset in sub-carriers in [an Integrated Services Digital Broadcasting-Terrestrial (ISDB-T)] *a* receiver [system], said apparatus comprising:

a storage device for storing said sub-carriers;

a processor for dividing said sub-carriers into two sub-sets, wherein [said] *the* sub-sets comprise an equal number of sub-carriers;

[digital logic] means for removing bad sub-carriers from a first sub-set of said sub-sets;

[digital logic] means for removing sub-carriers from a second sub-set of said sub-sets that correspond to said bad sub-carriers from said first sub-set of said [subsets] *sub-sets*;

means for computing a phase difference on each sub-carrier from each sub-set;

means for computing mean phase differences of each of said sub-sets; and means for computing a timing offset and a frequency offset in said sub-carriers using the computed mean differences.

16. The apparatus of claim 15, wherein said frequency offset in said sub-carriers is computed by summing said mean phase differences of said sub-sets.

17. The apparatus of claim 15, wherein said timing offset in said sub-carriers is computed by calculating [the] *a* difference of said mean phase differences of said sub-sets.

18. The apparatus of claim 15, wherein a bad sub-carrier occurs when a magnitude of a received signal in said sub-carrier is smaller than a predetermined threshold level.

19. The apparatus of claim 15, wherein said sub-carriers from said second sub-set of said sub-sets that correspond to said bad sub-carriers from said first sub-set of said [subsets] *sub-sets* are bad sub-carriers.

20. The apparatus of claim 15, wherein said sub-carriers from said second sub-set of said sub-sets that correspond to said bad sub-carriers from said first sub-set of said [subsets] *sub-sets* are good sub-carriers, wherein a good sub-carrier occurs when a magnitude of a received signal in said sub-carrier is equal to or larger than a predetermined threshold level.

*21. The method of claim 1, wherein said receiver comprises a mobile television receiver.*

*22. The program storage device of claim 8, wherein said receiver comprises a mobile television receiver.*

*23. The apparatus of claim 15, wherein said receiver comprises a mobile television receiver.*

* * * * *